United States Patent
Draxelmayr

(10) Patent No.: US 6,590,384 B1
(45) Date of Patent: Jul. 8, 2003

(54) METHOD OF COMMUNICATING WITH A BUILT-IN SENSOR, IN PARTICULAR A ROTATIONAL SPEED SENSOR

(75) Inventor: Dieter Draxelmayr, Villach (AT)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/716,900

(22) Filed: Nov. 20, 2000

(30) Foreign Application Priority Data

Nov. 19, 1999 (DE) .......................... 199 55 758

(51) Int. Cl.⁷ .......................... G01P 3/48; G01P 3/489; G08C 19/16; H04Q 1/18; G08B 29/00
(52) U.S. Cl. ................ 324/166; 324/160; 340/538; 340/310.02; 340/310.06
(58) Field of Search ................ 324/160, 163, 324/166, 173–175, 177; 340/441, 310.01, 310.02, 310.06, 538, 3.1, 3.7; 702/145, 147, 148

(56) References Cited

U.S. PATENT DOCUMENTS

| | | | |
|---|---|---|---|
| 4,174,517 A | * 11/1979 | Mandel | ................ 340/310.02 |
| 5,537,067 A | 7/1996 | Carvajal et al. | |
| 5,539,388 A | * 7/1996 | Modgil | |
| 5,593,430 A | * 1/1997 | Renger | |
| 5,742,225 A | * 4/1998 | Wetzel et al. | .......... 340/310.02 |
| 6,008,637 A | 12/1999 | Corbier | |
| 6,320,502 B1 | * 11/2001 | Hagl | ................. 340/310.02 X |

FOREIGN PATENT DOCUMENTS

| | | |
|---|---|---|
| DE | 25 21 388 A1 | 11/1976 |
| DE | 36 15 463 A1 | 11/1987 |
| DE | 195 11 140 A1 | 10/1996 |
| EP | 0 101 528 A1 | 2/1984 |
| EP | 0 800 059 A1 | 10/1997 |
| EP | 0 857 949 A1 | 8/1998 |

* cited by examiner

Primary Examiner—Gerard R. Strecker
(74) Attorney, Agent, or Firm—Laurence A. Greenberg; Werner H. Stemer; Ralph E. Locher

(57) ABSTRACT

The method allows communication with a built-in sensor, in particular a rotational speed sensor, which supplies successive signal pulses as output signal. The sensor is preferably built into a motor vehicle in such a way that it can be supplied with a supply voltage externally via a voltage supply line. The sensor is placed into a detection mode. The supply voltage on the voltage supply line is externally modulated. The modulated supply voltage received in the sensor is analyzed with regard to the fulfillment of a predetermined criterion stored in the rotational speed sensor. And, finally, the received modulated supply voltage is interpreted as an external communication signal if the criterion is fulfilled.

15 Claims, 4 Drawing Sheets

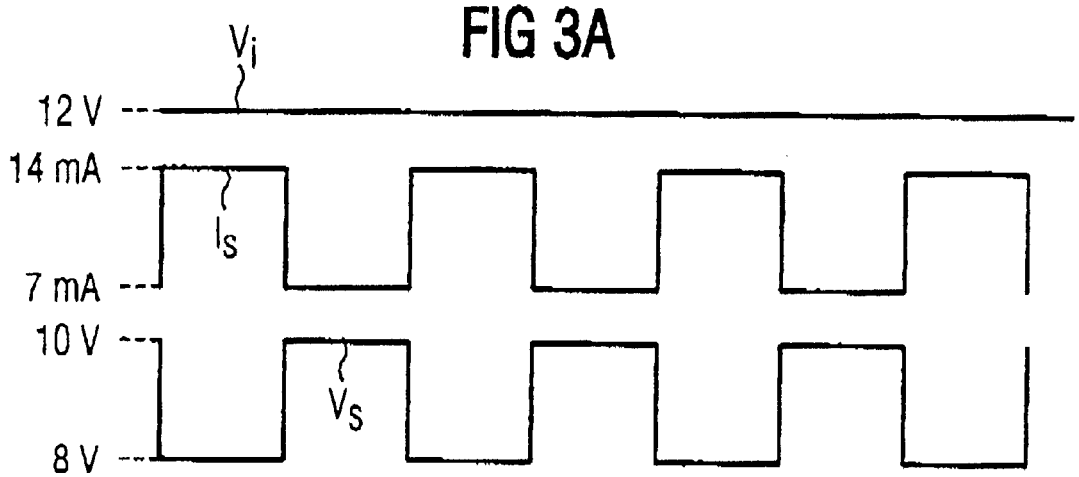
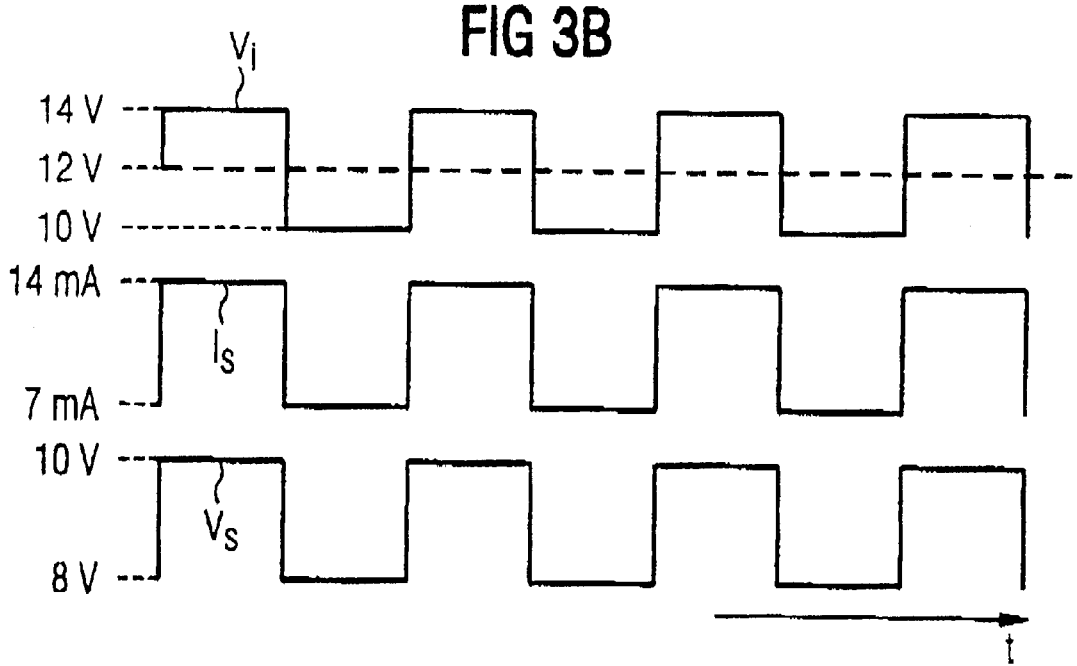

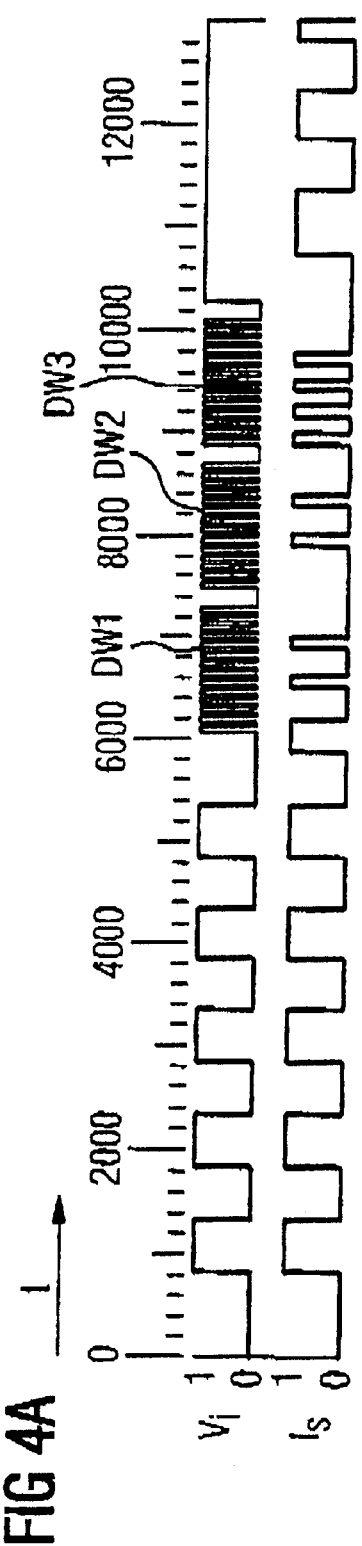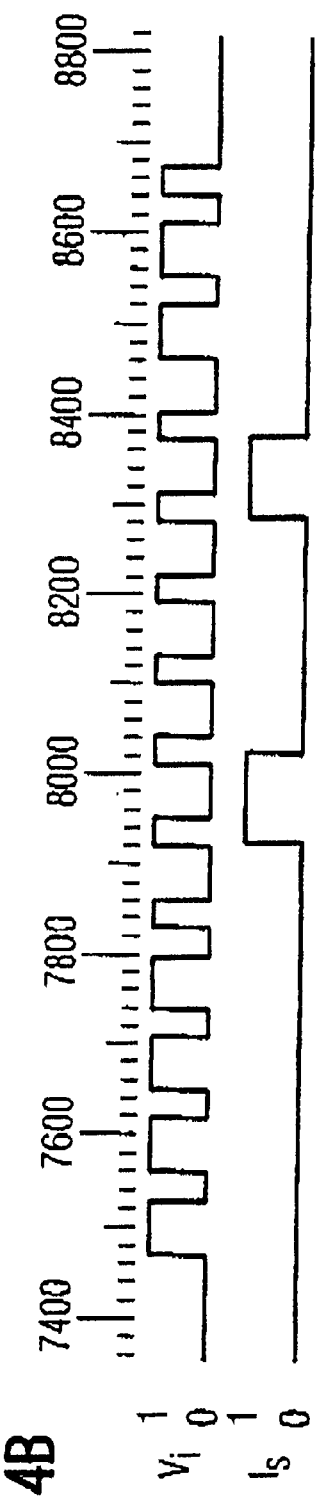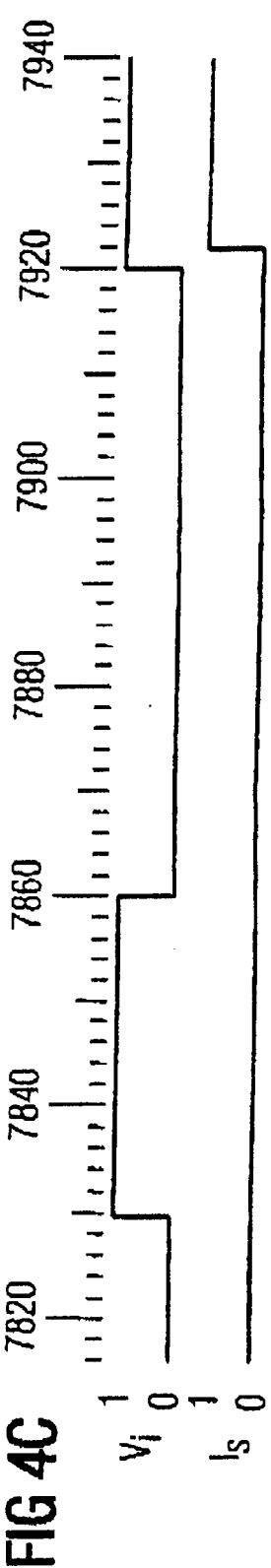

METHOD OF COMMUNICATING WITH A BUILT-IN SENSOR, IN PARTICULAR A ROTATIONAL SPEED SENSOR

BACKGROUND OF THE INVENTION

Field of the Invention

The present invention relates to a method of communicating with a built-in sensor, in particular a rotational speed sensor, which supplies an output signal with successive signal pulses. In a preferred embodiment, the sensor is built into a motor vehicle in such a way that it can be supplied with a supply voltage externally via a voltage supply line.

Although applicable to any desired sensors, the present invention and the problem area on which it is based are explained using a rotational speed sensor which supplies successive logic L and H signal pulses as output signal.

The prior art discloses various rotational speed sensors which are intended to be able to detect the revolutions of a wheel. By way of example, a sensor with a gearwheel is known, in which the teeth and gaps of the gearwheel are converted into logic H=HIGH and L=LOW states, respectively. The teeth and the gaps of the gearwheel are formed as alternating magnetic north and south poles of a ring magnet. When the gearwheel is rotated, a magnetic sensor, e.g. a Hall sensor, senses the alternating sequence of north and south poles. This alternating sequence can be then converted into logic H=HIGH and L=LOW states, respectively, of a magnet signal. In the case of a prior art two-wire current interface, these states are output such that each state is assigned a specific current consumption. As a result, the two supply lines can simultaeously be used as signal output lines as well.

A rotational speed sensor with a three-wire voltage interface is likewise known. In that case, too, the three supply lines can simultaneously be used as signal output lines as well.

In the prior art sensors of that type, however, it is not readily possible to ascertain the operational reliability with which it is operating. Depending on where it is built in, it may receive a very large or a very small input signal. Monitoring the mechanical assembly would be better served by an additional signal allowing a statement about the magnitude of the sensor signal.

More generally, the sensor is, as a rule, built into the motor vehicle at an inaccessible location, so that direct communication with the associated integrated intelligent circuit is not possible. Only the supply lines of the rotational speed sensor are freely accessible after the latter has been built in.

Therefore, in the case of the known approach above, what has turned out to be disadvantageous is the fact that it is no longer possible to perform programming or interrogation for a read-out of the sensor in the built-in state.

It was proposed, therefore, that the sensor send digital output data in a specific protocol which, in a specific reserve bit, can signal that a specific input signal magnitude has been exceeded. In general, it would be desirable at the same time to output the complete information about the input signal in this way, but the protocol is relatively simple and slow for reasons of interference immunity.

SUMMARY OF THE INVENTION

The object of the invention is to provide a method of communicating with a built-in sensor which overcomes the above-noted deficiencies and disadvantages of the prior art devices and methods of this kind, and in which it is possible to perform programming or interrogation for a read-out of the sensor in the built-in state without the operational reliability being reduced.

With the above and other objects in view there is provided, in accordance with the invention, a method of communicating with a built-in sensor, such as a rotational speed sensor which, in a preferred embodiment may be built into a motor vehicle, the sensor receiving a supply voltage externally via a voltage supply line and outputting an output signal with successive signal pulses. The novel method comprises the steps of:

placing the sensor into a detection mode;

externally modulating the supply voltage on the voltage supply line connected to the sensor;

analyzing the modulated supply voltage received in the sensor with regard to a fulfillment of a predetermined criterion stored in the sensor; and interpreting the received modulated supply voltage as an external communication signal if the criterion is fulfilled.

In other words, the concept underlying the present invention is found in the method steps which are carried out after the rotational speed sensor has been put into a detection mode: providing an external modulation of the supply voltage on the voltage supply line; analyzing the modulated supply voltage received in the sensor with regard to the fulfillment of a predetermined criterion stored in the sensor; and interpreting the received modulated supply voltage as an external communication signal if the criterion is fulfilled.

The novel method provides the particular advantage over the prior art solution approaches that it is possible to perform programming or interrogation for a read-out of the sensor in the built-in state without the operational reliability being reduced. In particular, it is possible to signal to the sensor the desire for a test mode which is largely insusceptible to interference.

In accordance with an added feature of the invention, the sensor outputs as its output signal a signal with successive logic L and H signal pulses.

In accordance with an additional feature of the invention, the sensor is a rotational speed sensor supplied externally via a two-wire current interface, and the method further comprises:

comparing the modulated supply voltage received in the rotational speed sensor with an associated sensor current; and interpreting the received modulated supply voltage as an external communication signal if a negative resistance characteristic is ascertained.

In accordance with another feature of the invention, the rotational speed sensor is switched into a communication mode if a negative resistance characteristic is ascertained over a predetermined number of cycles of the sensor output signal of respective L and H signal pulses.

In accordance with a further feature of the invention, in the communication mode, each modulation of the supply voltage having a predetermined signal duration and signal magnitude is interpreted as an external communication signal.

In accordance with again an added feature of the invention, a logic "1" corresponds to an H pulse with $2/3$ period duration and an L pulse with $1/3$ period duration.

Furthermore, a logic "0" may be defined as corresponding to an H pulse with $1/3$ period duration and an L pulse with $2/3$ period duration.

In accordance with again an additional feature of the invention, in the communication mode, outputting with the rotational speed sensor communication signals on the voltage supply line to an externally accessible terminal.

In accordance with again another feature of the invention, the supply voltage is maintained substantially constant in a case of no communication.

In accordance with again a further feature of the invention, the rotational speed sensor is connected to and can be supplied externally via a three-wire voltage interface.

In accordance with yet an added feature of the invention, in the communication mode, the rotational speed sensor outputs communication signals on the voltage output line to an externally accessible terminal point.

Other features which are considered as characteristic for the invention are set forth in the appended claims.

Although the invention is illustrated and described herein as embodied in a method of communicating with a built-in sensor, in particular a rotational speed sensor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 3A and 3B are signal diagrams illustrating, with respect to time, signal magnitudes of the circuit according to FIG. 1, wherein FIG. 3A represents the known measurement mode and FIG. 3B illustrates the changeover to the communication mode;

FIGS. 4A, 4B, and 4C are signal diagrams illustrating the transmitted signal pulses in an embodiment of the method according to the invention.

Identical and functionally equivalent component parts are identified with the same reference symbols throughout the figures.

DESCRIPTION OF THE PREFERRED EMBODIMENTS

Figure 1:
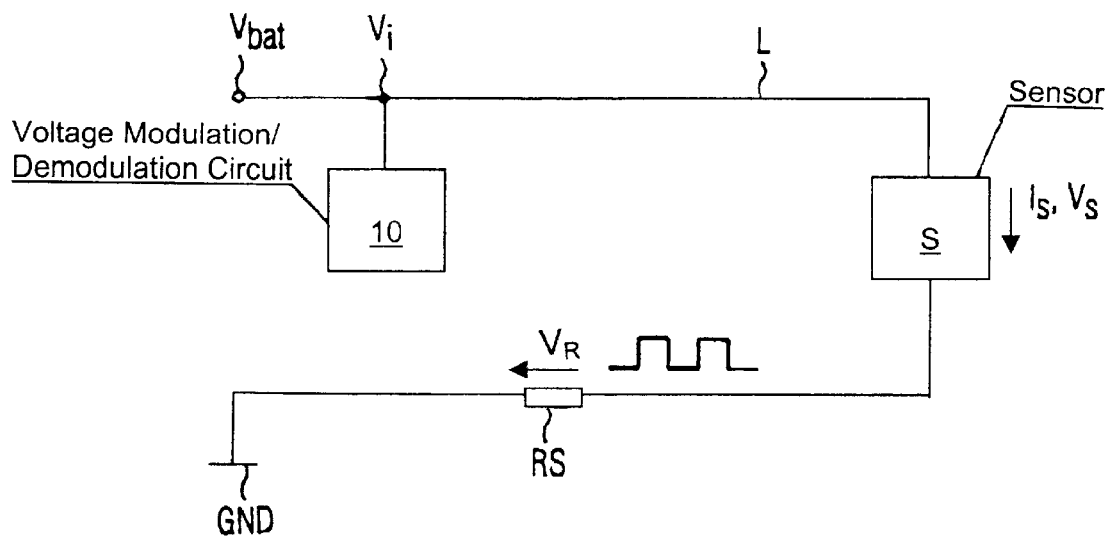
FIG. 1 is a schematic block diagram of a prior art rotational speed sensor circuit with a two-wire current interface.

Referring now to the figures of the drawing in detail and first, particularly, to FIG. 1 thereof, there is seen a schematic illustration of a prior art rotational speed sensor circuit with a two-wire current interface.

In FIG. 1, the reference symbol Vbat designates a battery voltage, 10 designates a voltage modulation/demodulation circuit, Vi designates a supply voltage, L designates a voltage supply line, RS designates a detection resistor, $V_R$ designates a detection voltage, S designates a sensor with an intelligent circuit, $I_S$, $V_S$ designate the sensor current and the sensor voltage, respectively, and GND designates ground.

Figure 2:
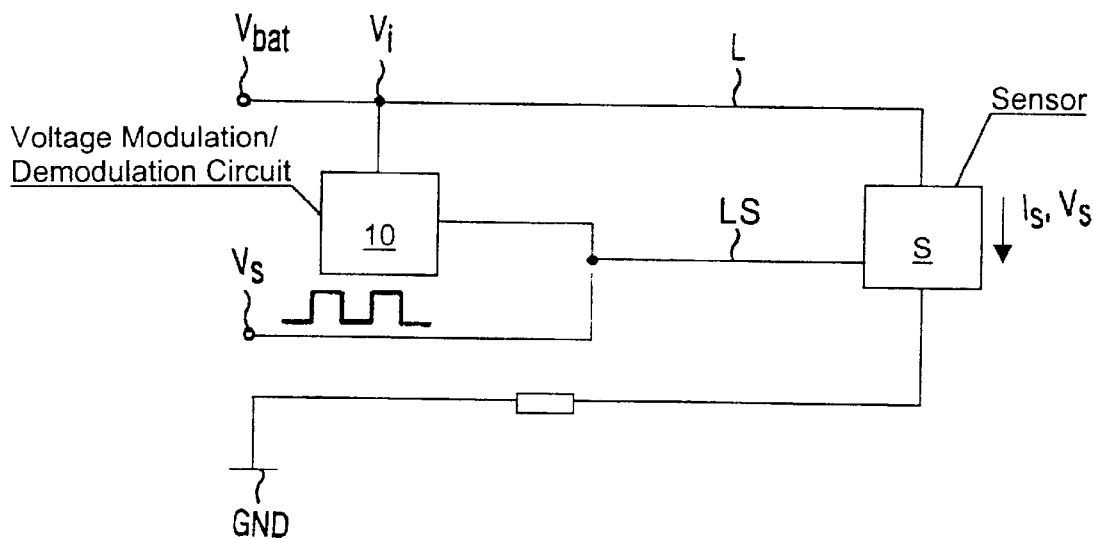
FIG. 2 is a schematic block diagram of a further prior art rotational speed sensor circuit with a three-wire voltage interface.

FIG. 2 shows a schematic illustration of a further prior art rotational speed sensor circuit with a three-wire voltage interface.

In the FIG. 2 circuit, a detection resistor RS is not provided, rather a voltage detection line LS is additionally routed to the "outside".

In both circuits, the sensor S with the intelligent circuit is no longer accessible after being built into the motor vehicle, but rather is "reachable" from outside only via the supply line L or voltage output line or ground line.

An exemplary embodiment of the invention is explained in more detail below with reference to the circuit according to FIG. 1.

FIGS. 3A and 3B show an illustration with respect to time of signal magnitudes in the circuit according to FIG. 1. More specifically, FIG. 3A illustrates the prior art measurement mode and FIG. 3B illustrates the changeover to the communication mode.

In this exemplary embodiment, it is proposed, for the changeover to the communication mode, to choose a voltage supply which has a negative resistance characteristic. Operation is then as follows:

If the sensor S recognizes a rotating wheel, then it modulates its current consumption accordingly and supplies successive logic L and H signal pulses as output signal. That detection state is illustrated in FIG. 3A. The supply voltage $V_i$ is essentially constant, i.e. apart from operationally dictated fluctuations which, however, are not intended to have any consequences with regard to the chosen mode. The sensor current $I_S$ has a square-wave form and varies between 7 mA and 14 mA and the sensor voltage $V_S$ correspondingly varies between 8 V and 10 V.

The voltage supply provides the sensor S with a low voltage in the case of a high current consumption and with a high voltage in the case of a low current consumption. Both supply voltages may perfectly well lie within the normal operating range.

In order to signal a desired communication or a communication mode, the voltage modulation/demodulation circuit 10 modulates the supply voltage $V_i$, as illustrated in FIG. 3B. In this case, the voltage supply supplies the sensor S with a high voltage in the case of a high current consumption and with a low voltage in the case of a low current consumption. In other words, a negative resistance characteristic is prescribed, or a phase shift by 0° between sensor current $I_S$ and sensor voltage $V_S$.

If the intelligent circuit of the sensor S then recognizes this state without interruption for a certain number of pulses (or a certain time), then the sensor switches into the test mode or communication mode. Since a negative resistance does not normally occur in real systems, "inadvertent" activation of the communication mode is largely prevented.

Figure 5:
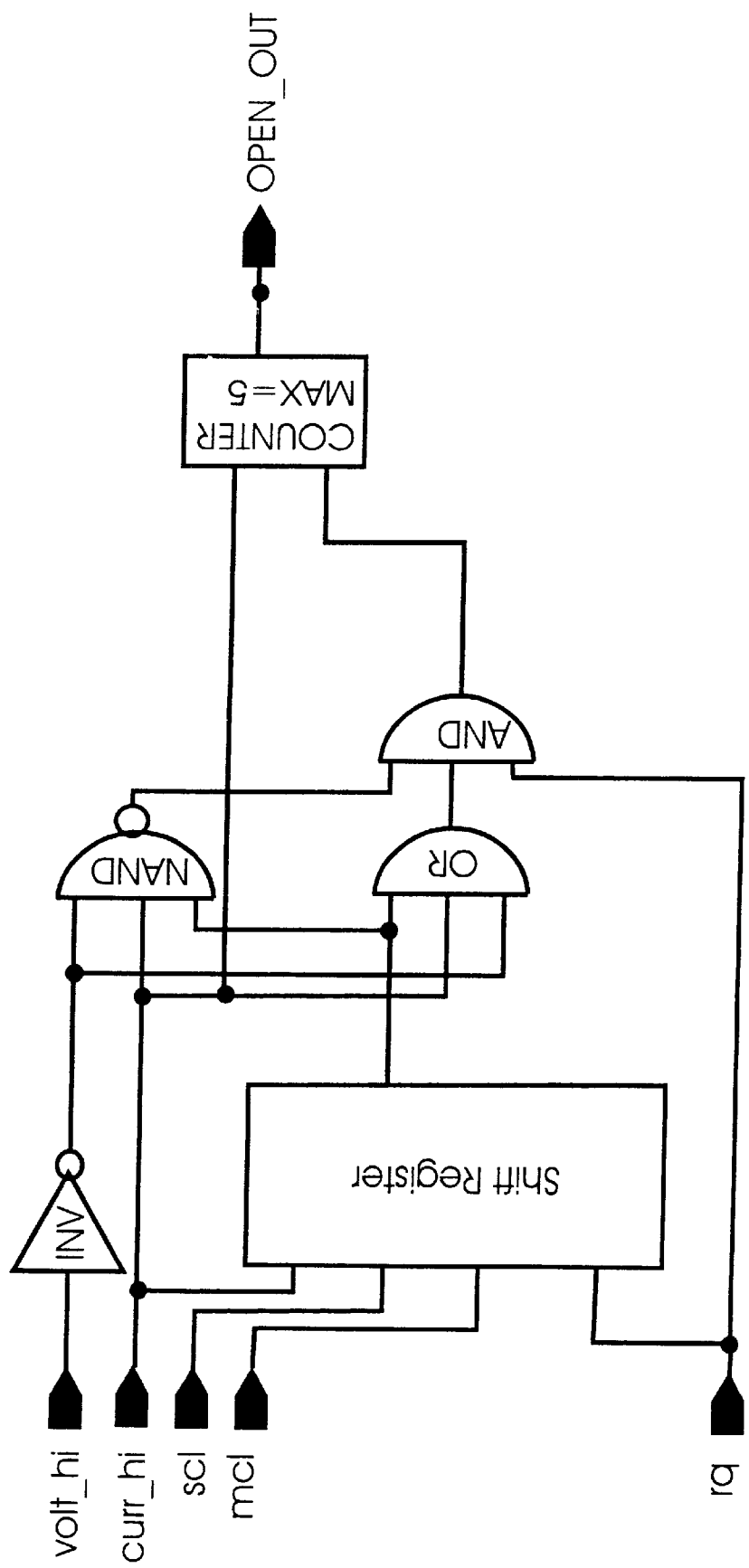
FIG. 5 shows a circuit for recognizing the presence of a negative resistance and for switching the sensor from normal operation to test mode or communication mode.

A circuit for recognizing the presence of a negative resistance and for switching the sensor from normal operation to test mode or communication mode is shown in FIG. 5. The circuit of FIG. 5 uses the output signal of a comparator "volt_hi", which indicates the supply voltage level $V_i$ (volt_hi=HI corresponds to a high supply voltage $V_i$, and LO corresponds to a low supply voltage $V_i$). In addition, the circuit of FIG. 5 uses the output signal of the sensor "curr_hi", which corresponds to the sensor current $I_S$, (curr_hi=HI corresponds to a high current, and LO to a low current). A negative resistance is present when "volt_hi" and "curr_hi" are both HI or both LO at the same time.

The circuit of FIG. 5 does not show the comparator, which distinguishes between the high and low levels of the supply voltage $V_i$ to provide a digital "volt_hi" with HI- and LO-levels. Preferably, the comparator includes a hysteresis, i.e., a forbidden gap between the high and low levels to detect large voltage changes.

The circuit of FIG. 5 checks whether or not the digital data generator operates with a negative resistance characteristic for a given number of "curr_hi" pulses. If so, the "OPEN_OUT" signal is activated to switch the sensor from the normal operation to the test mode or communication mode. The check for the negative resistance is performed by the INV, NAND, OR and AND gates, which provide a HI-level to the reset-input of the counter when the resistance is negative and a LO-level to the reset-input of the counter when the resistance is positive. The other input of the counter (clock-input) is connected with the "curr_hi"-signal, which increments the counter from zero to five for each curr_hi" cycle as long as the reset-input of the counter is at HI-level. Once the counter has been incremented to "5", it activates the "OPEN_OUT" signal to switch the sensor into the test or communication mode. Further, the counter remains at "5" until the reset-input is returned to LO-level due to a measured positive resistance at the input of the circuit of FIG. 5 (LO-level at the reset-input). When the reset-input returns to LO-level, the counter is reset to "0".

The shift register in FIG. 5 serves to mask possible time periods during which the processor of the digital data generator does not have time to initiate the correct "volt_hi" level (processor delay). Without the shift register, short "wrong" volt_hi/curr_hi signals (i.e., HI/LO or LO/HI) would interrupt each negative resistance pulse sequence and, accordingly, the output signal "OPEN_OUT" would never be activated. To suppress the "wrong" volt_hi/curr_hi signals, the shift register of FIG. 5 generates on each pulse slope a short time window during which the NAND and OR gates are deactivated. Master clock signal "mcl" and slave clock signal "scl" serve to clock the shift register. If "wrong" signals are detected outside the short time window, the reset-input returns to LO-level, the counter is reset to zero and the "OPEN_OUT" signal is deactivated. The same can be achieved with a central reset signal "rq" which resets the shift register and the counter.

This principle can be refined further. By prescribing specific voltage levels which must be present in the case of a specific current consumption, it is possible for the interference immunity also to be increased.

It is also conceivable to provide a plurality of possible "low" and "high" supply voltages which must be activated in a specific order to activate a specific communication mode. As a result, it would even be possible to effect selection between different communication modes.

It is not important here to provide a concrete numerical value for the negative resistance of the voltage supply. On the contrary, it may even be useful if this relationship exists only in discrete form (a specific current consumption range is assigned a specific voltage value) in order to reduce the risk of oscillation that otherwise arises.

If the communication mode has been attained, then the sensor behavior has to be changed over. In this case, it is possible to convert internal analog signals, for example the (amplified) sensor input signal, into a current and to output the same in analog form. Furthermore, it is also possible, of course, to switch the data protocol into a specific communication mode and thus be able to transmit significantly more data than normal.

The following procedure may be employed: During normal operation, the sensor S operates, as already described, with a slow, interference-immune protocol; consisting of logic "0" and "1" information items reflected in the current consumption of the sensor in accordance with FIG. 3A. In this case, the sensor operates in a wide operating voltage range (for example 4.5–24 V). If the operating voltage exceeds 9.5 V in the course of the high current consumption and falls below 8.5 V in the course of the negative current consumption (i.e. negative resistance) and this state lasts continuously over a specific number of data changes, then the sensor switches into the communication mode. The time immediately after the changeover of the current level is masked out here in order to give the supply voltage source time to establish the new voltage level. When the circuit is in the communication mode, a changeover is made to another data protocol.

In order to return to the case of normal operation, the following options are available: software reset by data protocol, switch off and switch on operating voltage, or a supply voltage greater than 5V for a certain duration (longer than 150 $\mu$s). The latter condition has the aim of automatically switching the chip back to normal operation under normal operating conditions (where the supply voltage is greater than 5 V). Specifically, the data protocol in the test mode is configured in such a way that operating voltages of less than 5 V are normally used.

The communication interface protocol then functions as follows in the case of this example: the default position of the supply voltage is low (<5 V). If a data word is desired to be transmitted, then a series of pulses are sent. A logic 1 is represented therein by a High pulse with $\frac{2}{3}$ period duration and a Low pulse with $\frac{1}{3}$ period duration; a logic 0 is represented by a High pulse with $\frac{1}{3}$ period duration and a Low pulse with $\frac{2}{3}$ period duration. At the end, a stop bit is also sent, which signals the end of the transmission. In this case, the duration of the High pulse is noncritical ($\frac{1}{3}$ or $\frac{2}{3}$ period); all that is important is that the succeeding Low pulse is long enough (>1 period). That is the signal that a complete word has now been transmitted. A new pulse train, representing the next word, can then be transmitted anytime afterwards.

Referring now to FIGS. 4A, 4B, and 4C, there are illustrated the transmitted signal pulses as a function of the time t in one embodiment of the method according to the invention.

In the simulation of a pulse train in FIG. 4:

a switch is made from normal operation to the communication mode;

data are transmitted; and a return is made to normal operation.

The signal $V_i$ symbolizes the value of the supply voltage of the intelligent circuit of the sensor S ("0" signifies below 5 V, and high signifies above 5 V or, in order to attain the communication mode, even above 7 V). The signal Is represents the current consumption of the sensor S (high or low current consumption, as illustrated in FIG. 3).

First of all, as illustrated in FIG. 4A, the circuit is in the normal mode. The circuit outputs a high or low current consumption $I_S$ during normal operation. As a reaction to this, the supply voltage $V_i$ is set to a high or low value. A changeover is then made to the communication mode with the $6^{th}$ edge of $I_S$. Three (3) data words DW1 to DW3 are then transmitted. Finally, the supply voltage $V_i$ is increased for a relatively long time. This leads to a return to the normal mode.

FIG. 4B shows, as a detail, the transmission of the second data word DW2. The word comprises 13 data bits and a stop bit. It can be seen that a new bit comes with each rising edge of $V_i$. Furthermore, it can be seen that logic ones and zeros are transmitted.

FIG. 4C shows, again in a detail enlargement, the transmission of one bit: as a reaction to a rising edge in $V_j$, a shift clock signal is generated (bit boundary). From the outside, that can be recognized from the fact that a new output bit appears with a certain delay.

This technique makes it possible, then, to obtain unlimited access to the communication interface of the sensor module. In the specific case, it is thus possible to access registers containing the present magnitude of the magnet signal.

Furthermore, the circuit also contains registers which store minimum and maximum magnet values. Moreover, there are status information items. As a result, it is now possible to read out the magnet signal digitally and to use the sensor in a way as measuring means.

It will be understood by those of skill in the pertinent art that, although the present invention has been described above using a preferred exemplary embodiment, it is not restricted thereto but rather can be modified in diverse ways.

The sensor does not have to be built into a motor vehicle, but can also be built into a household appliance, for instance, such as a washing machine.

In particular, although the above embodiment relates to a two-wire current interface, the invention can, of course, also be applied to a three-wire voltage interface or other interfaces.

Moreover, it is possible to provide any desired external modulations of the supply voltage on the voltage supply line, which are analyzed in the rotational speed sensor with regard to the fulfillment of a predetermined criterion stored in the rotational speed sensor, in order to be interpreted as an external communication signal if the criterion is fulfilled.

Moreover, the invention is not restricted to a rotational speed sensor, but rather can be applied to any desired sensors, such as e.g. pressure sensors, acceleration sensors, and the like. Likewise, logic output signals do not have to be present during sensor operation, rather there may be any desired signal pulses.

I claim:

1. A method of communicating with a built-in sensor, the sensor receiving a supply voltage externally via a voltage supply line and outputting an output signal with successive signal pulses, the method which comprises the steps of:

placing the sensor into a detection mode;

externally modulating the supply voltage on the voltage supply line connected to the sensor;

analyzing the modulated supply voltage received in the sensor with regard to a fulfillment of a predetermined criterion stored in the sensor;

interpreting the received modulated supply voltage as an external communication signal if the criterion is fulfilled;

switching the sensor to a mode different from the detection mode if the criterion is fulfilled; and in the different mode, outputting an output signal related to the different mode.

2. The method according to claim 1, which comprises outputting with the sensor an output signal having successive logic L and H signal pulses.

3. The method according to claim 1, wherein the sensor is a rotational speed sensor and the method further comprises:

supplying the rotational speed sensor externally via a two-wire current interface;

comparing the modulated supply voltage received in the rotational speed sensor with an associated sensor current; and interpreting the received modulated supply voltage as an external communication signal if a negative resistance characteristic is ascertained.

4. The method according to claim 3, which comprises switching the rotational speed sensor into a communication mode if a negative resistance characteristic is ascertained over a predetermined number of cycles of the sensor output signal of respective L and H signal pulses.

5. The method according to claim 4, which comprises, in the communication mode, interpreting each modulation of the supply voltage having a predetermined signal duration and signal magnitude as an external communication signal.

6. The method according to claim 5, wherein a logic "1" corresponds to an H pulse with ⅔ period duration and an L pulse with ⅓ period duration.

7. The method according to claim 5, wherein a logic "0" corresponds to an H pulse with ⅓ period duration and an L pulse with ⅔ period duration.

8. The method according to claim 4, which comprises, in the communication mode, outputting with the rotational speed sensor communication signals on the voltage supply line to an externally accessible terminal.

9. The method according to claim 1, which comprises maintaining the supply voltage substantially constant in a case of no communication.

10. The method according to claim 4, wherein the rotational speed sensor is connected to and can be supplied externally via a three-wire voltage interface.

11. The method according to claim 10, wherein, in the communication mode, outputting with the rotational speed sensor communication signals on the voltage output line to an externally accessible terminal point.

12. The method according to claim 1, wherein the sensor is a rotational speed sensor.

13. The method according to claim 1, wherein the sensor is a rotational speed sensor built into a motor vehicle and the method comprises measuring a rotary speed of a motor vehicle component.

14. The method according to claim 1, wherein the sensor is built into a motor vehicle and is externally accessible via the voltage supply line.

15. The method according to claim 1, wherein the sensor is built into a household appliance and is externally accessible via the voltage supply line.

* * * * *